(12) United States Patent
Sorek et al.

(10) Patent No.: US 7,489,829 B2
(45) Date of Patent: Feb. 10, 2009

(54) ADAPTIVE LOW-LIGHT IMAGE PROCESSING

(75) Inventors: Noam Sorek, Zichron Yaacov (IL); Ilia Vitsnudel, Even Yehuda (IL); Yuri Arshavsky, Netanya (IL)

(73) Assignee: Sightic Vista Ltd., Netanya (IL)

( * ) Notice: Subject to any disclaimer, the term of this patent is extended or adjusted under 35 U.S.C. 154(b) by 885 days.

(21) Appl. No.: 10/799,127

(22) Filed: Mar. 11, 2004

(65) Prior Publication Data

US 2004/0179108 A1 Sep. 16, 2004

Related U.S. Application Data

(60) Provisional application No. 60/453,286, filed on Mar. 11, 2003.

(51) Int. Cl.
*G06K 9/40* (2006.01)

(52) U.S. Cl. .................. 382/260; 382/274; 382/275; 358/3.26; 358/3.27

(58) Field of Classification Search ............ 382/260, 382/274, 275, 283; 358/3.26, 3.27, 463; 348/154, 155, 251
See application file for complete search history.

(56) References Cited

U.S. PATENT DOCUMENTS

| | | | |
|---|---|---|---|
| 4,296,436 A | 10/1981 | Achiha | |
| 5,442,407 A | 8/1995 | Iu | |
| 5,600,731 A | 2/1997 | Sezan et al. | |
| 5,835,562 A * | 11/1998 | Ramsdell et al. | 378/206 |
| 5,883,983 A * | 3/1999 | Lee et al. | 382/268 |
| 6,066,459 A * | 5/2000 | Garini et al. | 435/6 |
| 6,115,502 A | 9/2000 | De Haan et al. | |
| 6,185,320 B1 * | 2/2001 | Bick et al. | 382/132 |
| 6,226,045 B1 * | 5/2001 | Vidovich | 348/539 |
| 6,259,823 B1 * | 7/2001 | Lee et al. | 382/268 |
| 6,281,942 B1 | 8/2001 | Wang | |
| 6,442,202 B1 * | 8/2002 | Borer | 375/240.16 |
| 6,574,300 B1 * | 6/2003 | Florent et al. | 378/19 |
| 6,738,528 B1 * | 5/2004 | Nio et al. | 382/268 |
| 6,819,796 B2 * | 11/2004 | Hong et al. | 382/173 |
| 6,897,655 B2 * | 5/2005 | Brittain et al. | 324/309 |
| 6,995,793 B1 * | 2/2006 | Albadawi et al. | 348/239 |

OTHER PUBLICATIONS

Dubois, Eric et al., "*Noise Reduction in Image Sequences Using Motion-Compensated Temporal Filtering*"; IEEE Transactions on Communications; Jul. 1984; vol. COM-32, No. 7; pp. 826-831.

* cited by examiner

*Primary Examiner*—Yosef Kassa
(74) *Attorney, Agent, or Firm*—Pearl Cohen Zedek Latzer, LLP (57) ABSTRACT

A method for enhancing imaging in low light conditions, comprising: acquiring image data relating to a plurality of consecutive images; determining a local motion factor relating to the consecutive images by specifically processing the consecutive images in a predetermined manner in order to obtain an image mask that represents information about local motion; and processing the consecutive images, incorporating the image mask, to obtain final usable image information.

10 Claims, 6 Drawing Sheets

ADAPTIVE LOW-LIGHT IMAGE PROCESSING

PRIORITY REFERENCE TO PRIOR APPLICATION

This application claims benefit of U.S. provisional patent application no. 60/453,286, filed on Mar. 11, 2003, and is hereby incorporated by reference.

FIELD OF THE INVENTION

The present invention relates to improving sensitivity of video cameras and digital still cameras. More particularly it relates to improving the sensitivity of video cameras or digital still cameras by using an adaptive low-light processing method.

BACKGROUND OF THE INVENTION

With the advent of compact digital technology it becomes increasingly possible to introduce and implement various digital signal-processing methods in a range of products enhancing significantly their performance. Digital video and still cameras are good candidates for such integration. Modern cameras employ sensors, such as CCD (Charge Coupled Device) or CMOS (Complementary Metal Oxide Semiconductor), which are sampled to produce a digital signal, which is further processed by a special purpose DSP (Digital Signal Processing) device.

First approaches to temporal noise reduction appeared in literature in the early eighties (see for example, U.S. Pat. No. 4,296,436 (Achiha), and E. Dubois, "Noise Reduction in Image Using Motion-Compensated Temporal Filtering", IEEE Transactions on Communications, vol. COM-32, No. 7, pp. 826-831 (July 1984)). In these works simple adaptation of filter coefficients based on the difference between the incoming frame and the frame previously stored in the memory was used to adaptively smooth camera noise. In cases where motion is substantial, filter coefficients were chosen such that mostly the current frame reflecting the moving object was presented in the final image, whereas in areas with low-motion the temporal filtering have been strong leading to the significant noise suppression. Various modifications of the basic scheme have been introduced during the following years (see U.S. Pat. No. 5,600,731 (Sezan et al.), and U.S. Pat. No. 5,442,407 (Iu)). Later on, the methods for adaptive temporal filtering have been adopted for various applications, such as adaptive cleaning of the MPEG movies (U.S. Pat. No. 6,281,942 (Wang)) and using the local vs. global motion estimation considerations (U.S. Pat. No. 6,115,502, (De Haan et al.)).

SUMMARY OF THE INVENTION

There is thus provided, in accordance with some preferred embodiments of the present invention, a method for enhancing imaging in low light conditions, comprising:

acquiring image data relating to a plurality of consecutive images;

determining a local motion factor relating to the consecutive images by specifically processing the consecutive images in a predetermined manner in order to obtain an image mask that represents information about local motion; and processing the consecutive images, incorporating the image mask, to obtain final usable image information.

Furthermore, in accordance with some preferred embodiments of the present invention, the step of processing the consecutive images in a predetermined manner in order to obtain information about the local motion factor comprising using spatial and temporal filters.

Furthermore, in accordance with some preferred embodiments of the present invention, the spatial and the temporal filters are employed on the mask.

Furthermore, in accordance with some preferred embodiments of the present invention, the plurality of consecutive images are acquired in different conditions.

Furthermore, in accordance with some preferred embodiments of the present invention, the plurality of consecutive images are acquired using different exposure times.

Furthermore, in accordance with some preferred embodiments of the present invention, the plurality of consecutive images are acquired using different aperture.

Furthermore, in accordance with some preferred embodiments of the present invention, the plurality of consecutive images are acquired using different focusing distance.

Furthermore, in accordance with some preferred embodiments of the present invention, the method is carried out in an image domain.

Furthermore, in accordance with some preferred embodiments of the present invention, the method is carried out in a compressed image domain.

Furthermore, in accordance with some preferred embodiments of the present invention, the compressed image domain is JPEG or MPEG.

Furthermore, in accordance with some preferred embodiments of the present invention, before the step of determining a local motion factor the image data undergoes color desaturation.

Furthermore, in accordance with some preferred embodiments of the present invention, there is provided a device for enhancing imaging in low light conditions relating to a plurality of consecutive images acquired in low light conditions, comprising:

a module for determining a local motion factor relating to the consecutive images by specifically processing the consecutive images in a predetermined manner in order to obtain an image mask that represents information about local motion; and a module for processing the consecutive images, incorporating the image mask, to obtain final usable image information.

Furthermore, in accordance with some preferred embodiments of the present invention, the module for determining local motion factor comprises spatial and temporal filters.

Furthermore, in accordance with some preferred embodiments of the present invention, the module for determining local motion factor includes color desaturation.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

The present invention is aimed at enhancing low-light imaging, by increasing sensitivity.

The method of the present invention is suitable for enhancing the performance of digital cameras in low-light conditions, in the process of acquiring images, but the method of the present invention may also be used to improve images.

Images acquired in low light conditions usually suffer from motion blurring, caused by long-exposure times, and oversaturation of color. Blurring occurs at areas of the image where motion is present during the actual acquisition of the image.

It is asserted that the quality of low-light images can significantly be improved if a plurality of images are acquired, and a motion factor is locally determined with respect to areas of the images. The motion factor is used in the production of an image mask, which assigns weights to respective areas of the plurality of images, giving greater weights to information from the last image in areas where motion is substantial or greater weights to averaged information from the plurality of images in zones where little or no motion exists.

Furthermore it is asserted that the quality of low-light images can be significantly improved where special treatment is given to the luminance components deduced from the image signal. This treatment is characterized by processing that does not necessarily yield usable image data, however this processing enables determination and provision of a motion detection mask. This may be achieved by using different filters that those normally used in the proccesing of usable image data, or by using similar filters to those used in the processing of usable image data, but under different parameters or same parameters but in different ranges.

In accordance with the present invention, the image signal is to be separated, the luminance signal separately processed, and then the processed luminance recombined with the complete image data to produce the final image (or series of images, when video signal is considered).

The novel aspect of the present invention lies mainly in the separate refining of the luminance components of the image signal, and recombining the processed signal with the remaining components of the image signal (which may indeed to be processed). The recombined image signal may too undergo further processing.

Figure 1A:
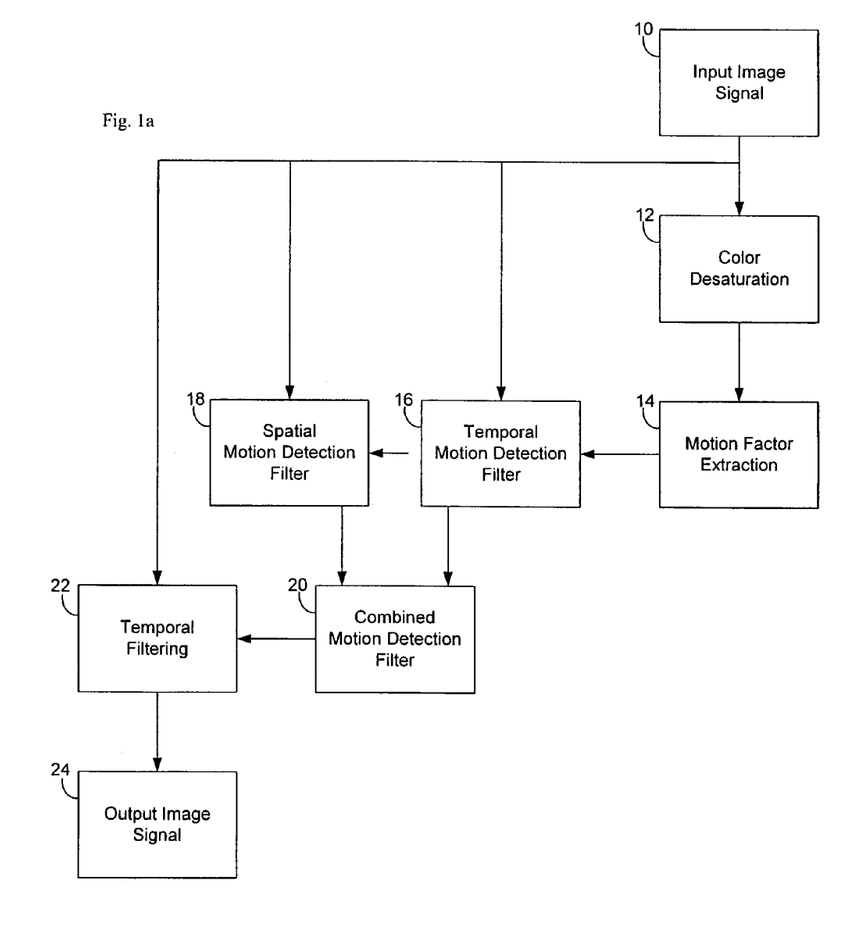
FIG. 1a illustrates a schematic overview of a method for enhancing low-light images, in accordance with a preferred embodiment of the present invention.

Reference is made to FIG. 1a, illustrating a schematic overview of a method for enhancing low-light images, in accordance with a preferred embodiment of the present invention.

Input image signal 10 (such as raw image data, but other initial image data may be used too) undergoes two separate processes: in one process—which is the novel aspect of the present invention—the input image signal is treated to extract a motion factor 14 (using a signal that has undergone color desaturation 12, preferably to produce a black and white signal), whereas in the other process, the signal is filtered, preferably spatially 18 and temporaly 16, to refine the signal and obtain a balanced signal. The motion factor is used in the filtering process and a combined signal undergoes motion detection filtering 20 (by employing a local mask produced using local motion detection results). The resulting processed signal is then preferably combined with information from the original image signal and temporally filtered 22 again, to produce the final output image signal 24.

Figure 1B:
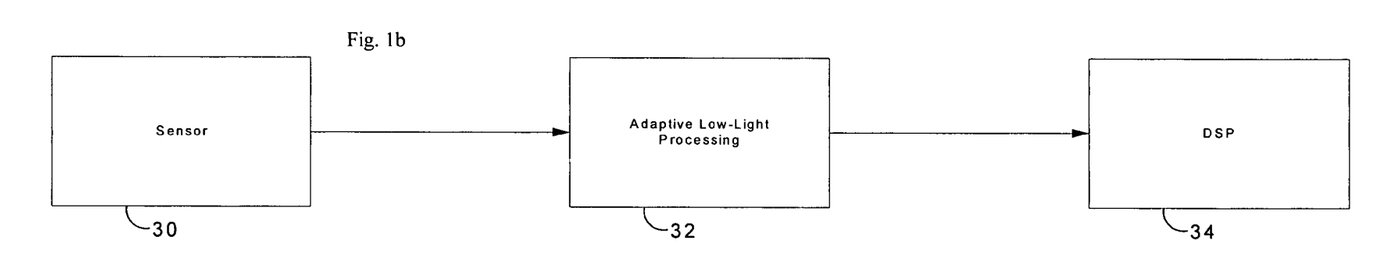
FIG. 1b illustrates schematically the incorporation of a method of enhancing low-light images according to the present invnetion with an image acquiring device.

FIG. 1b illustrates schematically the incorporation of a method of enhancing low-light images according to the present invnetion with an image acquiring device.

The method of the present invention may be incorporated in an image acquiring device (such as a digital camera, or video camera and other image acquiring devices). Image data picked up by the sensor 30 is processed in accordance with the adaptive low-light processing method 32 (which may be incorporated in the image acquiring device in the form of software or hardware) of the present invention, and the processed signal is then further processed by the device's digital signal processor (DSP) 34.

Figure 1C:
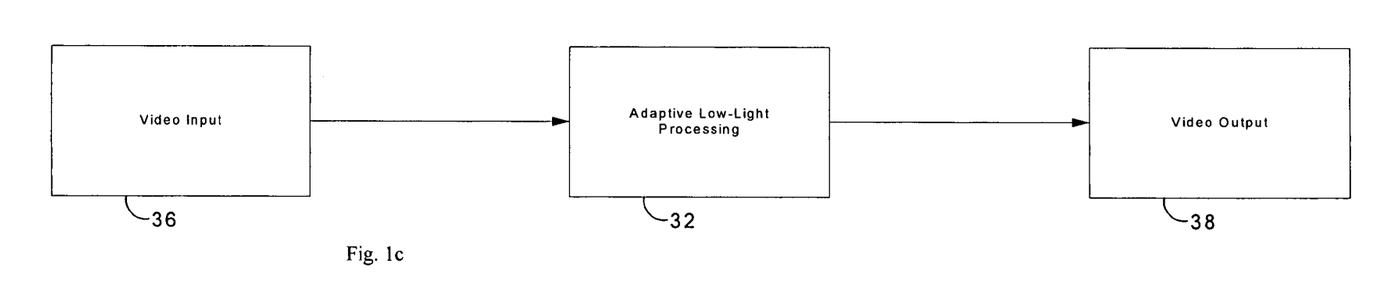
FIG. 1c illustrates schematically the use of a method of enhancing low-light images according to the present invnetion on previously acquired video data.

Alternatively the method of the present invention may be used on a previously acquired video signal. FIG. 1c illustrates schematically the use of a method of enhancing low-light images according to the present invnetion on previously acquired video data. Previously acquired video data 36 is processed in accordance with the adaptive low-light processing method 32 to produce a final video output signal 38.

Figure 1D:
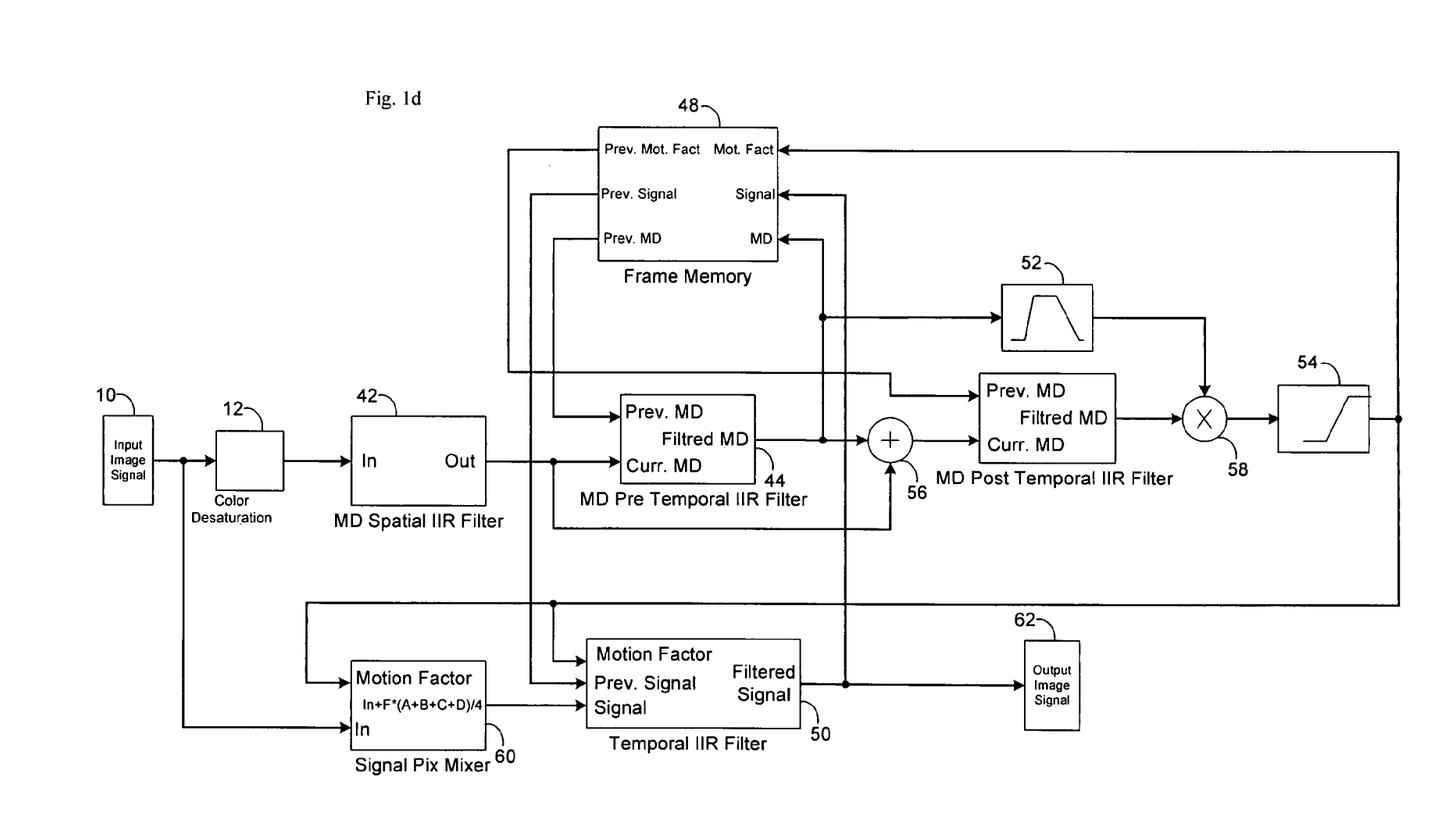
FIG. 1d illustrates schematically a method for enhancing low-light images, in accordance with a preferred embodiment of the present invention.

FIG. 1d illustrates schematically a method for enhancing low-light images, in accordance with a preferred embodiment of the present invention.

An input image signal 10 is acquired using an imaging means (for example a digital camera). The acquired signal comprising several frames (at least two) is accumulated in memory or on the camera sensor, and is passed through spatial and temporal adaptive filters to obtain the final result, which is acceptable to the human observer.

However, if the images are acquired in low-lighting conditions, the noise levels present in the acquired signal are extremely high, rendering a straightforward estimation of motion non-useful. Therefore, the novel method of the present invention for robust motion estimation is introduced. Prior to motion estimation the image signal is preferably subjected to a spatial filter 42 (which may be for example a spatial IIR filter, MD in FIG. 1*d* designates Motion Detection, indicating that this is a part of the motion detection processing of the present invention), which prevents erroneous motion detection and causes spreading of the motion pixels to areas reflecting moving parts in the image. Additionally, motion indication is also stored in the frame memory 48 and filtered temporally (temporal IIR filter 50) to enable subsequent consistent and smooth filtering of the frame sequence.

Moreover, the method of the present invention introduces a solution to cases were only as few as two or more images can be acquired to reproduce the final image, as is the case of digital still photography. As opposed to previous methods, the method of the present invention makes it is possible to utilize the ability of the camera sensor to produce a sequence of images with different integration times (this feature is typically be found in many digital cameras), suggesting that part of the time filtering is carried out on the sensor itself, at longer integration times, and more accurate data on moving parts is retrieved from the shorter integration parts of the image, as defined by the motion detection part.

The method of the present invention for adaptive filtering is applied directly to the sensor's mosaic data (as in CCD or CMOS sensors) signal output, operating separately on each of the chrominance components. However, using the fact that human eye is relatively sensitive to the color noise caused by mistakenly reconstructed color signal, a cross-filtering of various chrominance components is performed in order to reduce color noise.

The scheme shown in FIG. 1*d* basically consists of two major blocks and a memory for storing previously accumulated image data and indication data relating to motion detection.

The first block deals with motion estimation indication. Since the present invention relates to images with high noise levels, simple motion detection, which is usually used for the adaptive filtering, is not suited for the job here, as it does not produce a stable indication. There is an inherently different relation in the present invention between the motion detection part and the filtering part.

The second block (relating to filtering) requires a minimum level of spatial filtering (averaging) and this is for several reasons:

In regions of the image where no moving parts exist it is preferable to perform strong temporal filtering in order not to decrease resolution.

In regions of the image with motion, it is preferable to perform a weak temporal filtering (or no filtering at all) in order to let the eye activate its internal mechanism, which enables motion detection.

Furthermore, it is necessary to preserve the color components in order to reconstruct color output image.

Motion detection mechanism requires a comparison between a reference image and the image produced with minimal temporal averaging, because strong temporal averaging may delay and harm the detection quality in parts where motion exists.

Therefore, it is preferable to compare the reference image to the current image with spatial averaging, large as needed. Since the reference image and the current image have to have similar characteristics in order to be compared, it is not possible to use the output image for the motion detection, but to produce an in-dependent reference image. Therefore, the present invention involves separating between motion detection and filtering.

Prior to motion detection, simple averaging block is used to sum color components in order to get a signal with better signal-to-noise ratio—SNR (color desaturation 12).

Additional spatial filtering and temporal filtering is applied to the image signal to produce feasible motion detection signal. These filtering operations are illustrated in the drawing of FIG. 1*d* as MD Spatial IIR Filter 42 and MD Pre Temporal IIR Filter 44 blocks. The spatial filter is preferably a first-order two-dimensional IIR filter with adjustable coefficient that might be tuned to match the level of the noise and it is used to smooth different color components. The pre-temporal filter is also used to clean the image signal and actually bears the history of the signal, which is used for comparison with the current frame. It also has an adjustable coefficient to enable tuning of the desired history length.

Following the pre-temporal IIR filter 44 another temporal filter(MD post temporal IIR filter) 46 is used to further smooth the indication about the motion. The purpose of this additional smoothing is to eliminate sharp transitions in the motion indication, which will lead to abrupt changes in the final filtered image. Again, the coefficients of the post-temporal filter might be adapted to provide a final user with the desired measure of filtering as opposed to the noise visibility. The output from the pre-temporal and post-temporal filters is stored in the frame memory 48 together with data from the temporal filter 50.

A look-up table 52 is introduced in order to normalize the motion detection to the intensity level of the signal in order to provide a similar response to motion for all portions of the images disregarding the brightness. Look-up table 52 is responsible for tuning the coefficients of the final temporal filter 50 according to motion parameter. It allows fine-tuning of the extent of the temporal low-pass filter, which performs stronger filtering in "still" regions of the image and less significant filtering in "moving" regions. The plus sign 56 indicates addition, whereas the cross-sign 58 indicates multiplication.

In some applications of the present invention, Digital Signal Processing (DSP) can be made to get access to a limited number of frames in order to produce an output image, as is the case of digital still cameras (DSC) were the time to unload the data from the sensor is too long to allow large number of acquired frames per output result. In this case, we use smaller number of frames, were each frame has different integration time, i.e. the time domain integration is done on the sensor itself for part of the frames, and the motion detection filter is comparing the different frames, after passing through the equalization block, that compensates digitally for the different exposures.

The Pix Mixer 60 block serves to decrease the color noise present in the reconstructed image. Color noise is very disturbing to the human observer and while the noise remains in the image during motion it is desirable at least to reduce the colorfulness of the signal and display it in more grayish tones. Exploring the difference between adjacent pixels, which have different color filters on the sensor, produces color in the complementary mosaic CCD based camera. To render more grayish (neutral) tones it is possible to average close mosaic pixels to produce more uniform signal out of which color would be reconstructed. The mixture between the incoming signal (filtered mosaic pixel) and the average of adjacent image signal provides the means for reducing color noise and for improving signal-to-noise ratio. The extent of using averaging as opposed to the pixel itself provides the motion detection parameter from the previous stage.

Figure 2A:
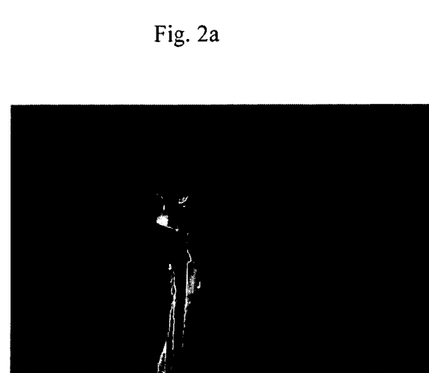
FIG. 2a illustrates an original image produced by a camera with common processing.

FIG. 2a illustrates an original image produced by a camera with common processing.

Figure 2B:
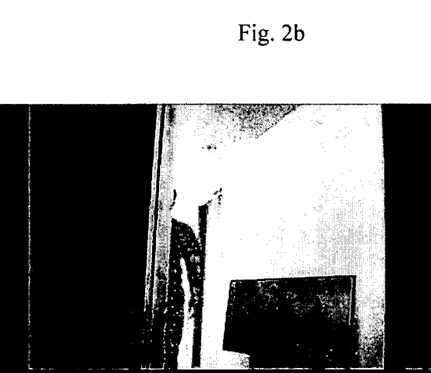
FIG. 2b illustrates an output image produced with the method of the present invention. The visibility of details in the image is greatly increased, while color is preserved in the still portions of the image and is reduced in the moving parts (human figure).

FIG. 2b illustrates an output image produced with the method of the present invention. The visibility of details in the image is greatly increased, while color is preserved in the still portions of the image and is reduced in the moving parts (human figure).

Figure 2C:
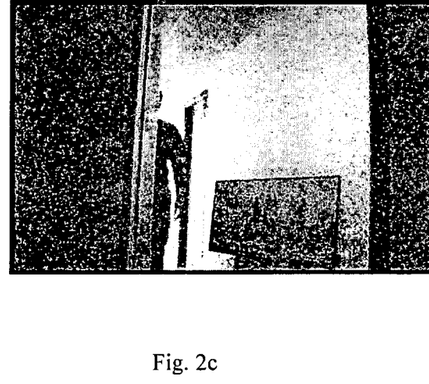
FIG. 2c illustrates an original image produced by a camera with common processing, where the output has been enhanced by a Gamma function to increase visibility. It is seen that the output becomes infested with strong color noise.

FIG. 2c illustrates an original image produced by a camera with common processing, where the output has been enhanced by a Gamma function to increase visibility. It is seen that the output becomes infested with strong color noise.

Figure 2D:
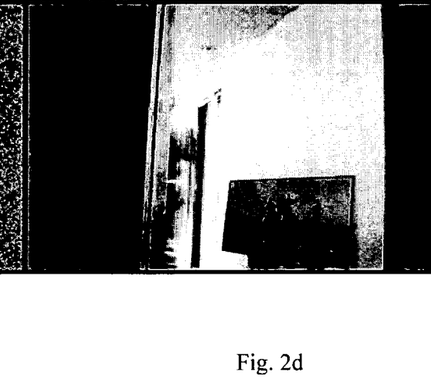
FIG. 2d illustrates an output image produced with temporal filtering of the acquired image information. It is seen that the moving object (human figure) is strongly smeared.

FIG. 2d illustrates an output image produced with temporal filtering of the acquired image information. It is seen that the moving object (human figure) is strongly smeared.

Another example of applying the method of the present invention is illustrated in FIGS. 3a-d, refering to black and white (gray-scale) imaging.

Figure 3A:
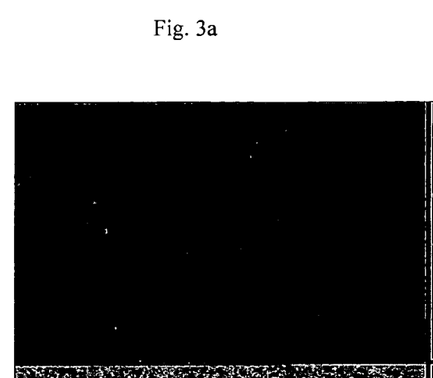
FIG. 3a illustrates an original image produced by a camera with common processing (black and white).

FIG. 3a illustrates an original image produced by a camera with common processing (black and white).

Figure 3B:
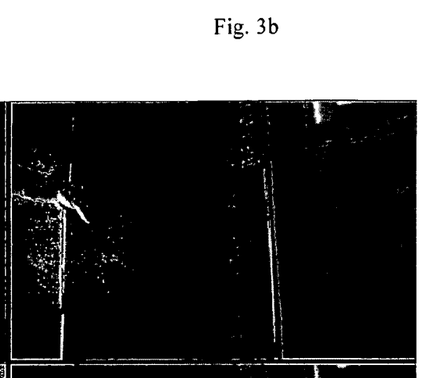
FIG. 3b illustrates an output image produced with the method of the present invention. The visibility of details in the image is greatly increased.

FIG. 3b illustrates an output image produced with the method of the present invention. The visibility of details in the image is greatly increased.

Figure 3C:
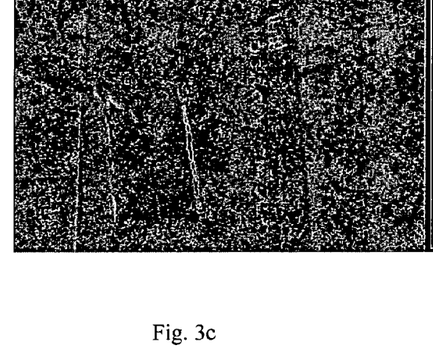
FIG. 3c illustrates an original image produced by a camera with common processing, where the output has been enhanced by a Gamma function to increase visibility. It is seen that the output becomes infested with strong noise.

FIG. 3c illustrates an original image produced by a camera with common processing, where the output has been enhanced by a Gamma function to increase visibility. It is seen that the output becomes infested with strong noise.

Figure 3D:
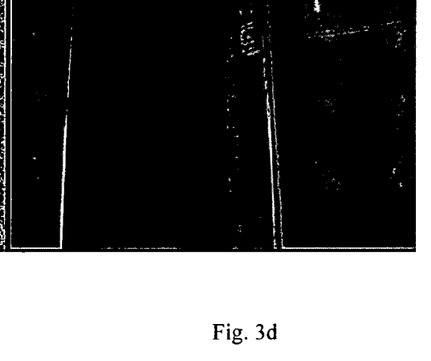
FIG. 3d illustrates an output image produced with temporal filtering of the acquired image information. It is seen that the moving object is strongly smeared.

FIG. 3d illustrates an output image produced with temporal filtering of the acquired image information. It is seen that the moving object is strongly smeared.

It should be emphasized regarding the operation of the present invention is that filtering is performed separately on the each mosaic component, thus requiring the use of two delay lines to make spatial IIR filtering in order to bring in respectful mosaic components.

Figure 4A:
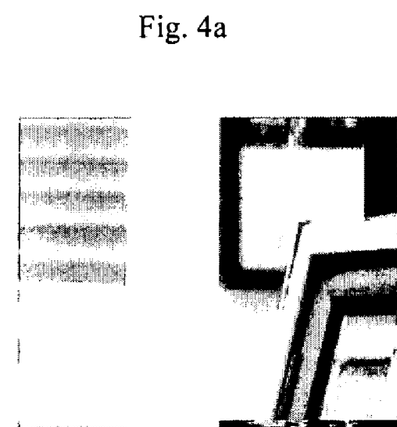
FIG. 4a illustrates an image produced by the camera with long exposure—and some motion blur due to camera motion—the image is vary clean but blurry.

FIG. 4a illustrates an image produced by the camera with long exposure —and some motion blur due to camera motion—the image is vary clean but blurry.

Figure 4B:
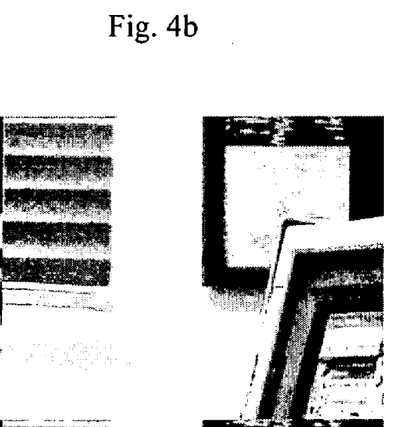
FIG. 4b illustrates an image produced by the camera with short exposure, after it was equalized to compensate digitally for the exposure difference. The image is noisy, but has less blur, and more details.

FIG. 4b illustrates an image produced by the camera with short exposure, after it was equalized to compensate digitally for the exposure difference. The image is noisy, but has less blur, and more details.

Figure 4C:
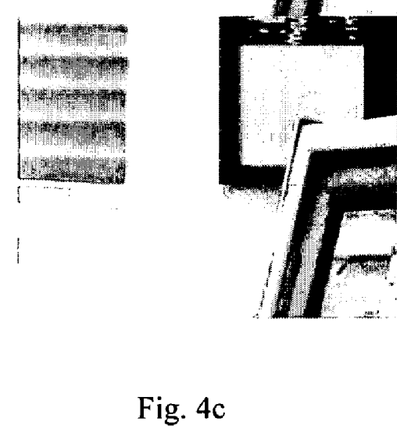
FIG. 4c illustrates an output image produced with the method of the present invention. The overall noise of the image is reduced, while the image has more details.

FIG. 4c illustrates an output image produced with the method of the present invention. The overall noise of the image is reduced, while the image has more details.

Figure 4D:
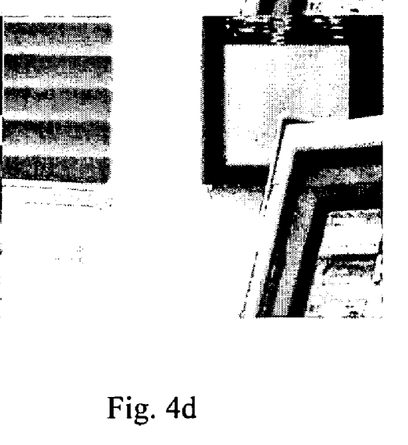
FIG. 4d illustrates an output image produced using the method of the present invention with different parameters.

FIG. 4d illustrates an output image produced using the method of the present invention with different parameters.

Note that the images shown in the figures are provided in black and white due to drawing restrictions only (apart from FIGS. 3a-d which were originally in black and white). The present invention indeed is suitable for color, as well as gray scale imaging.

The plurality of images acquired to be used in the method of the present invnetion can be acquired under different conditions, such as different exposure times, different aperture, different focusing distance, and possibly other varying* parameters.

The method of the present invention can be implemented in the image domain as well as in the compressed image domain (such as in JPEG or MPEG modes).

The method of the present invention may be implemented as software or as hardware (preferably in the form of a chip that may be incorporated in image acquiring devices, such as digital still or video cameras).

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for enhancing imaging in low light conditions, comprising:
    acquiring image data relating to a plurality of consecutive images;
    applying spatial and temporal filtering to a signal corresponding to the acquired image data;
    detecting local motion indication in the filtered image data;
    filtering the detected local motion indication;
    using a look up table, said look up table assigning greater weights to areas of greater local motion indication and lower weights to areas of smaller local motion indication, to obtain a local motion factor; and
    producing final image data by combining the acquired image data with a temporally filtered signal of the acquired image data using the local motion factor.

2. The method of claim 1, wherein the plurality of consecutive images are acquired in different acquisition conditions.

3. The method of claim 2, wherein the plurality of consecutive images are acquired using different exposure times.

4. The method of claim 2, wherein the plurality of consecutive images are acquired using different aperture.

5. The method of claim 2, wherein the plurality of consecutive images are acquired using different focusing distance.

6. The method of claim 1, carried out in an image domain.

7. The method of claim 1, carried out in a compressed image domain.

8. The method of claim 7, wherein the compressed image domain is JPEG or MPEG.

9. The method as claimed in claim 1, wherein the signal corresponding to the acquired image data comprises a luminance signal extracted from the acquired image data.

10. The method as claimed in claim 9, wherein the luminance signal is obtained by performing color desaturation.

* * * * *